United States Patent
Dawson et al.

(10) Patent No.: US 9,298,611 B2
(45) Date of Patent: *Mar. 29, 2016

(54) OUT-OF MEMORY AVOIDANCE IN DYNAMIC VIRTUAL MACHINE MEMORY ADJUSTMENT

(71) Applicant: International Business Machines Corporation, Armonk, NY (US)

(72) Inventors: Michael H. Dawson, Ottawa (CA); Charles R. Gracie, Kanata (CA); Graeme D. Johnson, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/219,140

(22) Filed: Mar. 19, 2014

(65) Prior Publication Data

US 2014/0208055 A1 Jul. 24, 2014

Related U.S. Application Data

(63) Continuation of application No. 13/682,086, filed on Nov. 20, 2012.

(51) Int. Cl.
*G06F 12/00* (2006.01)
*G06F 12/02* (2006.01)
*G06F 12/06* (2006.01)
*G06F 3/06* (2006.01)

(52) U.S. Cl.
CPC .......... *G06F 12/0253* (2013.01); *G06F 3/0604* (2013.01); *G06F 3/0608* (2013.01); *G06F 3/0626* (2013.01); *G06F 3/0629* (2013.01); *G06F 3/0631* (2013.01); *G06F 12/00* (2013.01); *G06F 12/02* (2013.01); *G06F 12/023* (2013.01); *G06F 12/0269* (2013.01); *G06F 12/0615* (2013.01); *G06F 12/0646* (2013.01)

(58) Field of Classification Search
None
See application file for complete search history.

(56) References Cited

U.S. PATENT DOCUMENTS

| | | | |
|---|---|---|---|
| 6,286,016 | B1 | 9/2001 | Heller et al. |
| 7,761,487 | B2 | 7/2010 | Bansal et al. |
| 7,792,879 | B2 | 9/2010 | Qi et al. |
| 8,156,492 | B2 | 4/2012 | Dahlstedt |
| 2002/0091904 | A1* | 7/2002 | Haggar et al. ............. 711/170 |
| 2008/0162863 | A1 | 7/2008 | McClure et al. |
| 2010/0031270 | A1 | 2/2010 | Wu et al. |
| 2011/0320682 | A1 | 12/2011 | McDougall et al. |

OTHER PUBLICATIONS

United States Patent and Trademark Office, Office Action for U.S. Appl. No. 13/682,086, filed Oct. 10, 2014, pp. 1-14, Alexandria, VA, USA.

(Continued)

*Primary Examiner* — Midys Rojas
(74) *Attorney, Agent, or Firm* — Lee Law, PLLC; Christopher B. Lee

(57) ABSTRACT

An unused free memory shortage relative to an adjusted heap maximum size associated with a memory heap of application memory is detected. The adjusted heap maximum size is set to a heap size smaller than a maximum heap allocation size. An increase to the adjusted heap maximum size that resolves the unused free memory shortage is calculated. The adjusted heap maximum size is increased by the calculated increase to the adjusted heap maximum size.

8 Claims, 6 Drawing Sheets

(56) References Cited

OTHER PUBLICATIONS

Ting Yang, et al., CRAMM: Virtual Memory Support for Garbage-Collected Applications, Proceedings of the 7th Symposium on Operating Systems Design and Implementation, 2006, pp. 103-116 (plus one citation page added), USENIX Association, Berkeley, CA, USA.

Michael R. Hines, et al., Applications Know Best: Performance-Driven Memory Overcommit With Ginkgo, Proceedings of the 2011 IEEE Third International Conference on Cloud Computing Technology and Science, Nov. 29, 2011, pp. 130-137 (plus one citation page added), IEEE Computer Society, Washington, DC, USA.

Rafael Alonso, et al., An Advisor for Flexible Working Sets, Proceedings of the 1990 ACM SIGMETRICS Conference on Measurement and Modeling of Computer Systems, May 1990, pp. 153-162 (plus one citation page added), Association for Computing Machinery, New York, NY, USA.

Liangliang Tong, et al., Exploiting Memory Usage Patterns to Improve Garbage Collections in Java, Abstract only, Proceedings of the 8th International Conference on the Principles and Practice of Programming in Java, 2010, pp. 39-48, Association for Computing Machinery, New York, NY, USA.

Weiming Zhao, et al., Dynamic Memory Balancing for Virtual Machines, Abstract only, Newsletter: ACM SIGOPS Operating Systems Review, Jul. 2009, pp. 37-47, vol. 43, Issue 3, Association for Computing Machinery, New York, NY, USA.

United States Patent and Trademark Office, Office Action for U.S. Appl. No. 13/682,086, filed May 8, 2015, pp. 1-11, Alexandria, VA, USA.

United States Patent and Trademark Office, Office Action for U.S. Appl. No. 13/682,086, filed Oct. 22, 2015, pp. 1-14, Alexandria, VA, USA.

United States Patent and Trademark Office, Notice of Allowance for U.S. Appl. No. 13/682,086, Jan. 11, 2016, pp. 1-9, Alexandria, VA, USA.

\* cited by examiner

OUT-OF MEMORY AVOIDANCE IN DYNAMIC VIRTUAL MACHINE MEMORY ADJUSTMENT

RELATED APPLICATIONS

This application is a continuation of and claims priority to and claims the benefit of U.S. patent application Ser. No. 13/682,086 titled "OUT-OF-MEMORY AVOIDANCE IN DYNAMIC VIRTUAL MACHINE MEMORY ADJUSTMENT," which was filed in the United States Patent and Trademark Office on Nov. 20, 2012, and which is incorporated herein by reference in its entirety.

BACKGROUND

The present invention relates to virtual machine working set memory space. More particularly, the present invention relates to out-of-memory avoidance in dynamic virtual machine memory adjustment.

Virtual machines may execute on hardware platforms that allow the virtual machines to execute programs/processes as if the virtual machines are hardware computing devices. The hardware platforms may allow multiple separate virtual machines to coexist. Each virtual machine may have its own memory space, operating system instance, and resource set, or may share certain resources.

BRIEF SUMMARY

A method includes detecting, via a processor, an unused free memory shortage relative to an adjusted heap maximum size associated with a memory heap of application memory allocations, where the adjusted heap maximum size is set to a heap size smaller than a maximum heap allocation size; calculating an increase to the adjusted heap maximum size that resolves the unused free memory shortage; and increasing the adjusted heap maximum size by the calculated increase to the adjusted heap maximum size.

A system includes a memory and a processor programmed to: detect an unused free memory shortage relative to an adjusted heap maximum size associated with a memory heap of application memory allocations within the memory, where the adjusted heap maximum size is set to a heap size smaller than a maximum heap allocation size; calculate an increase to the adjusted heap maximum size that resolves the unused free memory shortage; and increase the adjusted heap maximum size by the calculated increase to the adjusted heap maximum size.

A computer program product includes a computer readable storage medium having computer readable program code embodied therewith, where the computer readable program code when executed on a computer causes the computer to: detect an unused free memory shortage relative to an adjusted heap maximum size associated with a memory heap of application memory allocations, where the adjusted heap maximum size is set to a heap size smaller than a maximum heap allocation size; calculate an increase to the adjusted heap maximum size that resolves the unused free memory shortage; and increase the adjusted heap maximum size by the calculated increase to the adjusted heap maximum size.

DETAILED DESCRIPTION

Figure 1:
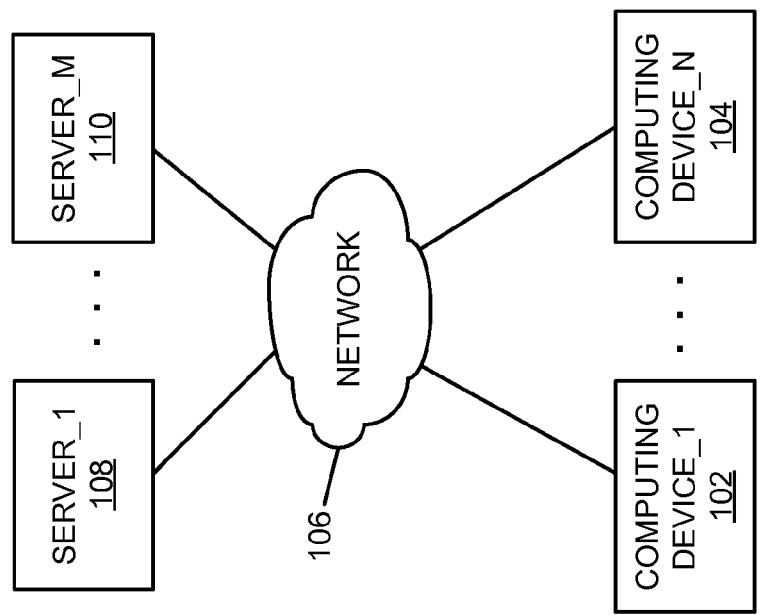
FIG. 1 is a block diagram of an example of an implementation of a system for out-of-memory avoidance in dynamic virtual machine memory adjustment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides out-of-memory avoidance in dynamic virtual machine memory adjustment. The present technology provides a collaborative interaction between a virtual machine and a garbage collector to allow a virtual machine to use less operating system (OS) memory when it is not needed, without preventing the virtual machine from using more memory when more memory is needed. To implement the present technology, a callback routine is added that is triggered by the garbage collector (GC) when an out-of-memory (OOM) error is about to occur or has occurred. The callback routine may be implemented by an out-of-memory handler process/module. In response to determining that an out-of-memory (OOM) condition is about to occur (or has occurred), the garbage collector invokes the callback routine indicating that the OOM condition is pending. When the callback routine is invoked, the amount of memory needed to allow the application to continue running is determined. Processing may be performed to determine the amount of increased memory needed to modify the maximum size of the working set (increased working set size adjustment). Invocation of the callback routine may optionally include the amount of memory needed for the allocation, and the determined increased size adjustment of the working set may be performed by analysis of the callback itself. Available memory is added for application execution by the callback out-of-memory handler. Depending upon the technique being employed to adjust the available heap memory, the out-of-memory handler of the callback either moves the adjusted maximum size upwards by the determined amount or deflates the balloon that consumes heap space by the determined amount to add available memory for application execution. The out-of-memory handler of the callback is then allowed to request that the memory allocation be retried. A return value of the callback routine may be used to allow the process handling the callback to request that the GC retry the allocation attempt in response to an adjustment of the allocated maximum memory for the virtual machine. As such, out-of-memory conditions may be avoided in the context of dynamic adjustment of heap memory that is available for virtual machines to allocate to applications.

The present technology modifies the virtual machine to provide certainty and real-time dynamic processing capabilities to avoid out-of-memory conditions in dynamic virtual machine memory adjustment. Using the present technology, the virtual machine is updated such that system processing knows with certainty when the adjusted maximum is going to cause an OOM condition, knows with certainty how much memory is required to satisfy the allocation so that the adjusted maximum is increased by an optimal amount, and allows retry of the attempted allocation after the working set size adjustment has been made.

Additional processing may be performed to detect GC pressure and to change the adjusted maximum to relieve this pressure. For example, even if the adjusted maximum used by the GC does not cause OOM conditions, it may cause pressure on the GC that causes the virtual machine to operate less efficiently than would otherwise be possible. An extension to the present technology allows the GC to provide a second callback that indicates that the GC is "under pressure," defined herein as having to work hard and consuming resources because the available heap memory is low. Again depending upon the technique being employed to adjust the available heap memory, the out-of-memory handler for this second callback may either modify the adjusted maximum upwards or deflate the balloon that consumes heap memory by the appropriate amount to lessen the pressure. As such, efficiency may be further improved by use of this second callback.

For purposes of the present description, the phrase "working set" refers to available memory resources for a virtual machine or process, and more particularly to the memory that a process actually consumes. For example, an operating system (OS) may write contents of a memory page to disk if the memory page has not been used recently. While such a memory page is within the virtual address space of a process, storage of this memory page to disk no longer consumes physical memory within the current memory spaces, and as such, would not be considered part of the working set. In contrast, memory pages that have been touched/accessed recently and already loaded into memory are considered part of the working set for a process.

It should be noted that conception of the present subject matter resulted from recognition of certain limitations associated with virtual machine working sets. For example, it was observed that traditional virtual machines, such as a Java™ virtual machine (JVM®), allow the heap to expand and grow as memory demands increase. It was further observed that the result of this form of memory consumption is that over time the operating system (OS) memory allocated for the object heap in the virtual machine tends towards the maximum allowed when the virtual machine was started even though the virtual machine may only need the maximum for defined intervals (e.g., between 9:00-10:00 am as users traditionally log into a particular application). As a consequence, it was determined that such behavior by conventional virtual machines prevents memory over-provisioning for Java™ programming language applications because the over-provisioned memory would not be released for other uses when no longer needed. It was additionally observed that heavily virtualized computing environments, such as cloud computing environments, are designed to realize cost savings by maximizing the density of applications that may be run per unit of hardware, and that such processing improves utilization rates of the hardware and energy efficiency by eliminating idle machines. However, it was additionally observed that conventional virtual machines are not configured to recognize and exploit these virtualized environments. For example, it was determined that because virtualized environments utilize over-provisioning based upon the knowledge that not all guests will need their maximum resource allocation at the same time, conventional virtual machines that consume resources to their maximum potential allocations are not suitable for virtualized environments. As such, it was determined that in order to maximize application density in highly-virtualized environments, virtual machines must be redesigned to reduce the resource footprint that is consumed. It was further determined that virtual machines must be reconfigured to adapt to changing resource allocation, to share more resources across multiple virtual machine instances, and to leverage hypervisor-specific functionality such as fast guest-to-guest network fabric.

It was additionally observed that while some solutions for contracting the heap size have been attempted, such as a downward adjustable memory maximum or an inflatable balloon that consumes the heap, these solutions may still result in out-of-memory (OOM) conditions if the contracted available memory size for the virtual machine is set too low. For example, it was determined that setting the maximum memory used by the garbage collection (GC) to be less than the original maximum may lead to OOM errors if an application needs more memory than the adjusted maximum that has been set. As such, it was additionally determined that a solution to avoiding OOM conditions and to recovering from contracting the available memory size to too low of a level was also needed. The present subject matter improves virtual machine memory availability adjustment by providing for out-of-memory avoidance in dynamic virtual machine memory adjustment, as described above and in more detail below. Using the present technology, a virtual machine may coordinate with a garbage collector and a memory contraction management component to identify pending OOM conditions and a previous memory contraction may be reversed prior to an actual OOM condition occurring. As such, improved virtual memory working set adjustments may be obtained through use of the out-of-memory avoidance in dynamic virtual machine memory adjustment described herein.

While the present description utilizes the callback implementation described above for purposes of the examples described herein, additional alternatives exist for out-of-memory avoidance in dynamic virtual machine memory adjustment. These alternatives include, for example, avoiding memory over commit for Java™ programming language applications when running multiple virtual machines in one operating system (OS) or when running multiple virtual machines in multiple guests in a virtualized environment. With this implementation, more total memory may be provisioned to account for the over-commit avoidance. As another alternative, heap usage monitoring and heuristics may be used to determine when to adjust the available heap back from a decreased level toward the maximum working set initially provided when a given application was started. One possible monitoring implementation may include determining whether the memory used by the heap is growing even though the heap is already above the newly set adjusted maximum (this would be in a case where the adjusted maximum may be set to a level smaller than the current heap size). Another possible monitoring implementation includes determining whether there is heavy garbage collection (GC) activity while there is little free space in the heap. This technique may utilize probabilities as to whether there is an issue related to a pending OOM condition and additional time may be utilized to identify whether there is an actual OOM issue. As such, with such a situation OOM conditions may still occur. Additionally, such an implementation may be more conservative by providing less optimal adjustments of the available heap size. As such, the examples described herein utilize the callback implementation described above to provide efficient and effective real-time out-of-memory avoidance in dynamic virtual machine memory adjustment. However, it is understood that the description herein may be modified or combined with the alternatives described above as appropriate for a given implementation.

The out-of-memory avoidance in dynamic virtual machine memory adjustment described herein may be performed in real time to allow prompt dynamic working set size adjustment for virtual machines while avoiding OOM conditions. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for out-of-memory avoidance in dynamic virtual machine memory adjustment. A computing device_1 102 through a computing device_N 104 communicate via a network 106 with several other devices. The other devices include a server_1 108 through a server_M 110.

As will be described in more detail below in association with FIG. 2 through FIG. 5B, the computing device_1 102 through the computing device_N 104 and the server_1 108 through the server_M 110 may each provide automated out-of-memory avoidance in dynamic virtual machine memory adjustment. The automated out-of-memory avoidance in dynamic virtual machine memory adjustment is based upon programmatic recognition of pending potential OOM conditions and intervention to increase available memory within the working set to avoid the OOM condition. As described above, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

Figure 2:
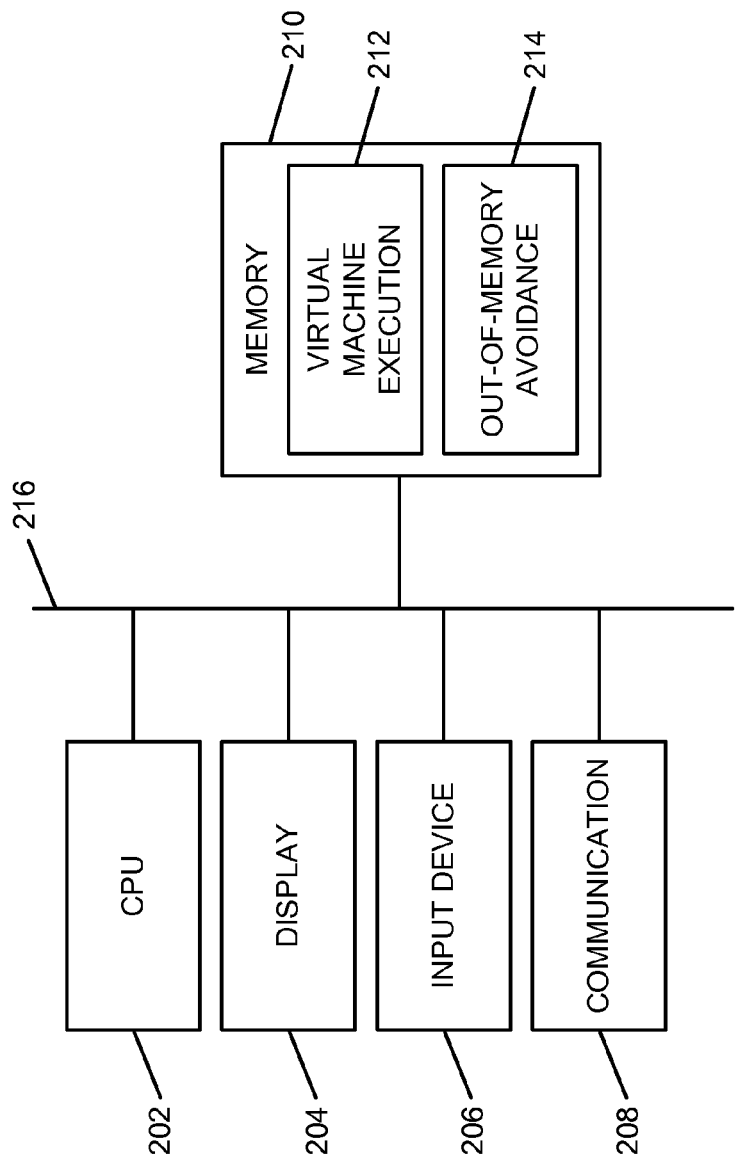
FIG. 2 is a block diagram of an example of an implementation of a core processing module capable of performing out-of-memory avoidance in dynamic virtual machine memory adjustment according to an embodiment of the present subject matter.

FIG. 2 is a block diagram of an example of an implementation of a core processing module 200 capable of performing out-of-memory avoidance in dynamic virtual machine memory adjustment. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a virtual machine execution area 212 that provides virtual machine instantiation and processing space within the core processing module 200. As will be described in more detail below, virtual machines executing within the virtual machine execution area 212 may manage (or may be managed to provide), either independently or in conjunction with one another, out-of-memory avoidance in dynamic virtual machine memory adjustment. Further, multiple virtual machines may be instantiated within the virtual machine execution area 212, as appropriate for a given implementation.

It is understood that virtual machines may be configured in a variety of ways. For example, a virtual machine may include a heap area where application objects are allocated, an application execution space, and a garbage collector. A virtual machine may also include its own operating system (OS) instance, or multiple virtual machines may share an OS instance. Other variations for virtual machine implementation exist, and all such variations are considered to be within the scope of the present subject matter.

The memory 210 also includes an out-of-memory avoidance module 214. The out-of-memory avoidance module 214 performs the out-of-memory avoidance in dynamic virtual machine memory adjustment described herein in conjunction with one or more executing virtual machines. The out-of-memory avoidance module 214 operates as a memory contraction management component to adjust heap maximum sizes and perform other processing, as described above and in more detail below. The out-of-memory avoidance module 214 is illustrated separately from the virtual machine execution area 212 for ease of illustration purposes. However, it should be noted that the out-of-memory avoidance module 214 may be implemented within the virtual machine execution area 212, and may be implemented within an executing virtual machine, as appropriate for a given implementation.

It should also be noted that the out-of-memory avoidance module 214 may be implemented in association with a workload manager type of component where appropriate for a given implementation, such as within a multiple guest environment. Alternatively, the out-of-memory avoidance module 214 may be implemented as part of a hypervisor platform. Within any such an implementation, a memory allocation policy may be modified to allow the out-of-memory avoidance module 214 to know/identify the total memory and allocations to all of the instantiated virtual machines. The out-of-memory avoidance module 214 may analyze and evaluate free memory in each host virtual machine to determine whether any guests are using too much memory.

In response to determining that any guest is using too much memory or that free memory exists within any virtual machine, the out-of-memory avoidance module 214 may request the virtual machine inside of any such guest to shrink the allocated memory or increase the allocated memory, as a per guest decision. As another alternative, the out-of-memory avoidance module 214, if implemented within each guest, may determine that it has free memory and shrink its own adjusted maximum level. Such processing may cause the hypervisor to further identify free memory and further decrease memory allocations to individual guests.

For any such implementation, where the out-of-memory avoidance module 214 detects a potential OOM condition, processing may be performed to increase the allocated heap memory to the respective virtual machine, again by either increasing the adjusted maximum or deflating the balloon. The out-of-memory avoidance module 214 may further recognize memory "pressure" on one or more virtual machines. Alternatively, a dedicated or shared operating system instance may detect memory pressure on a virtual machine and coordinate with the out-of-memory avoidance module 214 to respond and to dynamically adjust allocated heap memory for one or more virtual machines to avoid a pending OOM condition.

Further, where multiple virtual machines are implemented, the physical memory limits heap sizes allocated to each virtual machine. In such an implementation, collaborative memory reduction management may be performed. Virtual machines may be configured to communicate directly under certain implementations to implement collaborative memory reduction management with the out-of-memory avoidance module 214 implemented within each virtual machine. Each virtual machine may adjust its adjusted maximum heap usage in real time to free resources for use by other virtual machines, and to avoid pending OOM conditions. However, it should be noted that there is no requirement for out-of-memory avoidance modules 214 within virtual machines to communicate directly as long as there is some mechanism to obtain information about memory consumption within virtual machines of a multiple virtual machine environment. As such, a variety of possibilities exist for implementation of the present technology, and all such possibilities are considered to be within the scope of the present technology.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

It should be noted that out-of-memory avoidance module 214 may form a portion of other circuitry described without departure from the scope of the present subject matter. Further, the out-of-memory avoidance module 214 may include instructions executed by the CPU 202 for performing the functionality described herein. The CPU 202 may execute these instructions to provide the processing capabilities described above and in more detail below for the core processing module 200. The out-of-memory avoidance module 214 may form a portion of an interrupt service routine (ISR), a portion of an operating system, a portion of a browser application, or a portion of a separate application without departure from the scope of the present subject matter. It should further be noted that the out-of-memory avoidance module 214 may be implemented as a separate hardware component as appropriate for a given implementation.

The CPU 202, the display 204, the input device 206, the communication module 208, and the memory 210 are interconnected via an interconnection 216. The interconnection 216 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and the memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
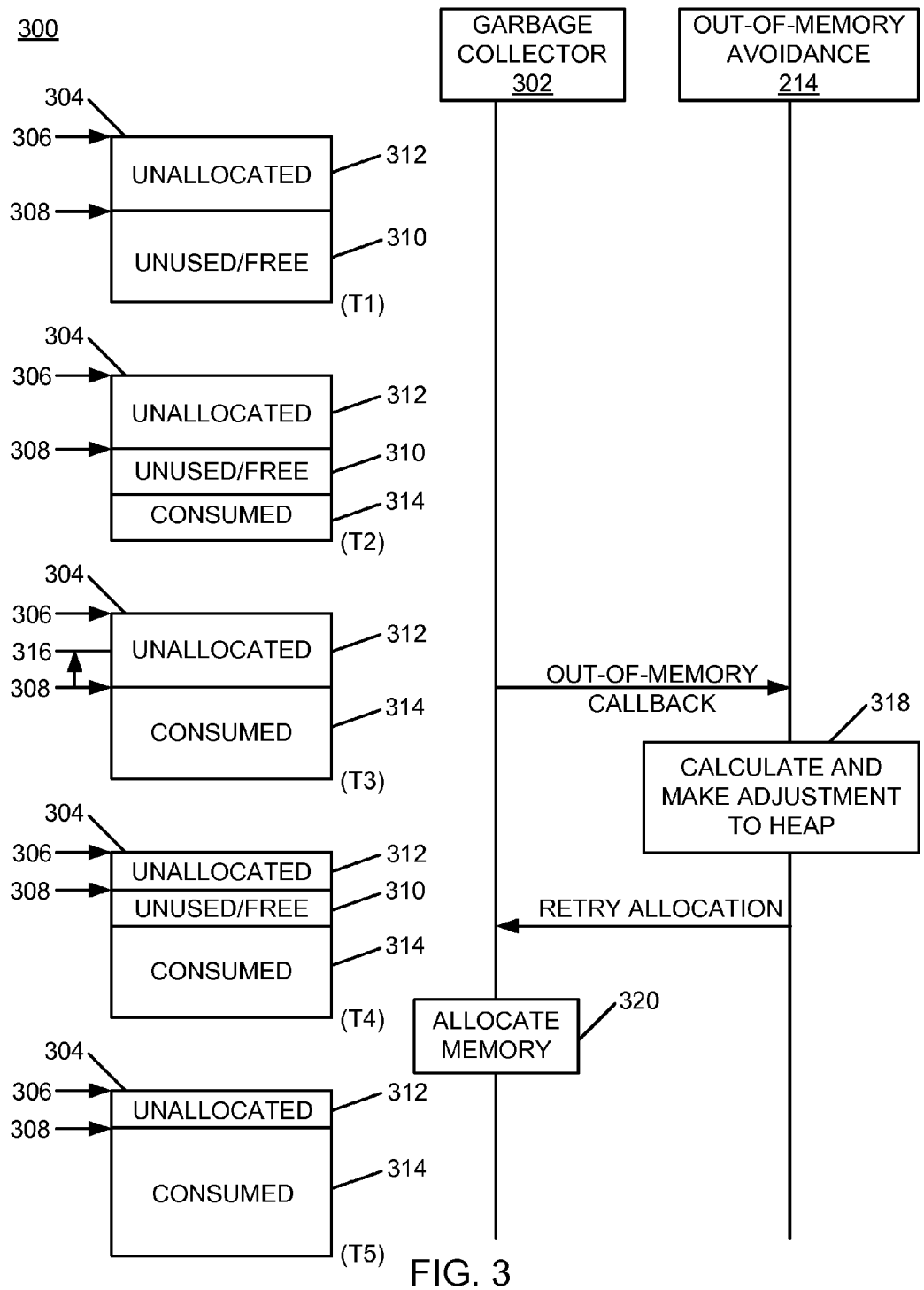
FIG. 3 is a message flow diagram of an example of an implementation of a message flow for out-of-memory avoidance in dynamic virtual machine memory adjustment according to an embodiment of the present subject matter.

FIG. 3 is a message flow diagram of an example of an implementation of a message flow 300 for out-of-memory avoidance in dynamic virtual machine memory adjustment. A garbage collector 302 is shown along with the out-of-memory avoidance module 214 described above. The garbage collector 302 is representative of a garbage collector module associated with a virtual machine instantiated within the virtual machine execution area 212 of the memory 210. It is understood that each virtual machine instantiated within the virtual machine execution area 212 may include a garbage collector 302, and that the out-of-memory avoidance module 214 may interact with each garbage collector 302 to implement the present technology.

A heap 304 represents a memory area within the virtual machine with which the garbage collector 302 is associated. The heap 304 is represented at different times, beginning with a representation at a time (T1). At the time (T1) the heap is initially empty.

The heap 304 has an original maximum allocated size represented by an arrow 306. An arrow 308 represents an adjusted maximum size of the heap 304. An unused free space 310 within the heap 304 below the adjusted maximum size represents space that may be allocated for application-level allocation requests generated by applications executing within the respective virtual machine. An unallocated heap area 312 above the unused free space 310 within the heap 304 represents heap space that may not be allocated to application-level allocation requests without changing the adjusted maximum size, as represented by arrow 308, and as described in more detail below. The unallocated heap area 312 may be implemented either by an adjusted maximum setting represented by the arrow 308 or may be implemented as a balloon within the heap 304 that is inflated to consume the unallocated heap area 312, as appropriate for the given implementation.

Over time, as applications generate memory allocation requests, the garbage collector 302 allocates the memory requested within the respective requests. At a time (T2), one or more applications are consuming a portion of the originally unused free space 310 (shown at the time (T1)) within the heap 304 as represented by the consumed space 314, with the remainder of the unused free space 310 as illustrated at the time (T2). As can be seen from FIG. 3, the memory usage at the time (T2) is below the adjusted maximum represented by the arrow 308.

At a time (T3), the one or more applications have used all of the previously unused free space 310 to the adjusted maximum level and the unused free space 310 no longer exists and is filled by the consumed space 314. For purposes of the present example, it is assumed that at least one of the applications needs more memory. It should be noted that without the present technology, any application that needs more memory would have suffered an OOM error at the time (T3) and would have likely terminated as a result of the OOM error.

However, the present technology allows the garbage collector 302 to send an out-of-memory callback to the out-of-memory avoidance module 214 at the time (T3). The out-of-memory callback may include a requested amount of increased heap size based upon the requested allocation from the application that is in need of more memory, as represented by the line 316 and the vertical arrow associated with the heap 304 at the time (T3). The application memory allocation request may be temporarily blocked without the application terminating in error.

In response to receiving the out-of-memory callback, the out-of-memory avoidance module 214 calculates/determines an amount of additional unused free space to be added to the heap 304 and makes the adjustment to the heap 304 at block 318. The out-of-memory avoidance module 214 may calculate/determine the amount of additional unused free space to be added to the heap 304 based upon information provided within the out-of-memory callback by the garbage collector 302. Alternatively, the out-of-memory avoidance module 214 may be configured for increment adjustments of the heap 304 based upon the frequency of out-of-memory callbacks from the garbage collector 302, based upon total available memory, or based upon any other factor appropriate for a given implementation. Further, the maximum allocated heap adjustment may be implemented by either increasing the maximum adjusted heap level setting or deflating a balloon that is consuming the heap above the adjusted maximum level, as appropriate for the given implementation.

At a time (T4), the heap adjustment is completed and the heap 304 again includes unused free space 310 based upon the new adjusted maximum represented by the adjusted arrow 308, and the out-of-memory avoidance module 214 sends a retry allocation message to the garbage collector 302. At block 320, the garbage collector 302 retries the memory allocation request within the unused free space 310 of the heap 304. At a time (T5), the heap 304 is again consumed to the adjusted maximum represented by the adjusted arrow 308 and the consumed space 314 fills the heap 304 to the new adjusted maximum. The application may be notified of the successful memory allocation and unblocked to continue processing.

It should additionally be noted that the out-of-memory callback may alternatively be implemented as a variation where the garbage collector 302 invokes an "under pressure" callback that informs the out-of-memory avoidance module 214 that the garbage collector 302 is having to work hard to obtain available memory for new memory allocation. In such an implementation, the out-of-memory callback implemented as the "under pressure" callback may be performed prior to an application requesting a memory allocation that cannot be fulfilled to avoid temporarily blocking the application on the memory allocation request.

As such, the present technology may be implemented so that the virtual machine may know with certainty when the adjusted maximum is going to cause an OOM condition, know with certainty how much memory is required to satisfy the allocation so that the adjusted maximum is increased by an optimal amount, and allow retry of the attempted allocation after the working set size adjustment has been made. Further, as memory is no longer needed, the out-of-memory avoidance module 214 may reclaim memory from the heap 304 by either decreasing the adjusted maximum setting represented by the arrow 308 or by inflating a balloon that increases the size of the unallocated heap area 312. The out-of-memory avoidance module 214 may determine that memory is no longer being consumed by analysis of the unused free space 310 within the heap 304 of each respective instantiated virtual machine.

Figure 4:
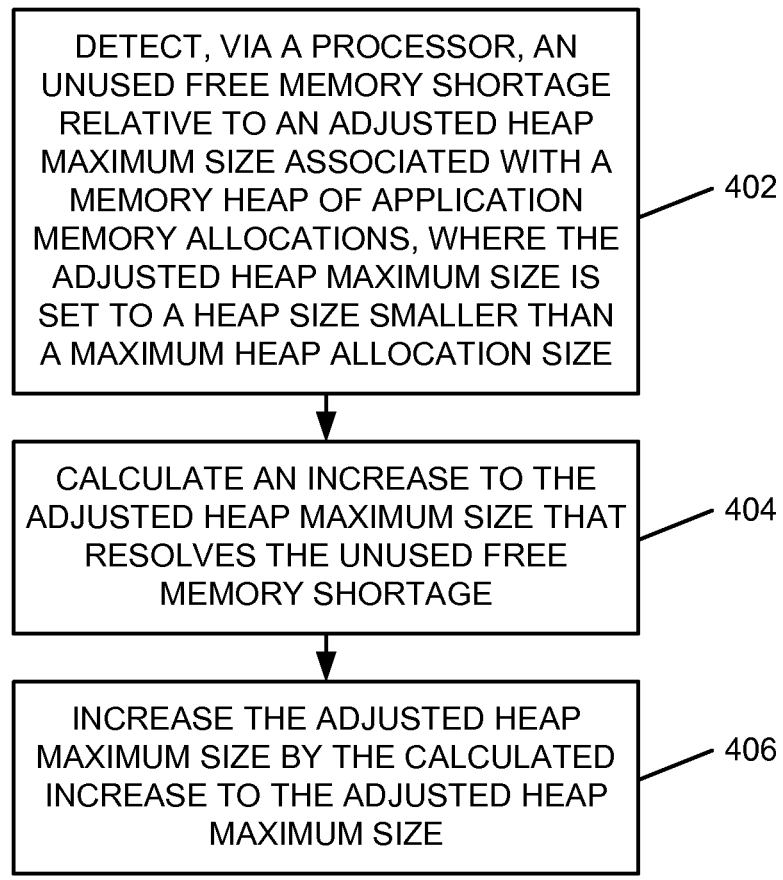
FIG. 4 is a flow chart of an example of an implementation of a process for out-of-memory avoidance in dynamic virtual machine memory adjustment according to an embodiment of the present subject matter.
Figure 5A:
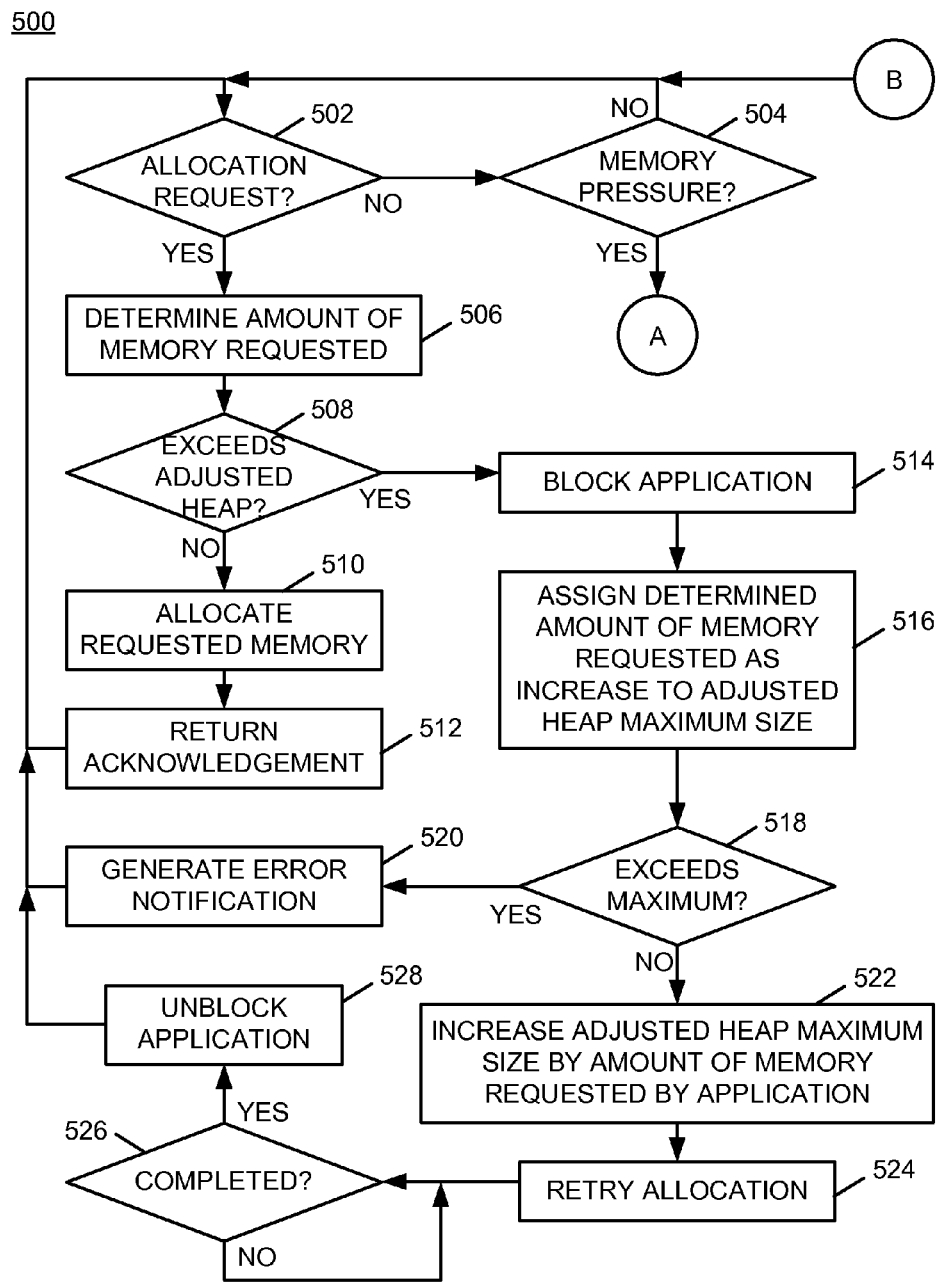
FIG. 5A is a flow chart of an example of an implementation of initial processing within a process for out-of-memory avoidance in dynamic virtual machine memory adjustment according to an embodiment of the present subject matter.
Figure 5B:
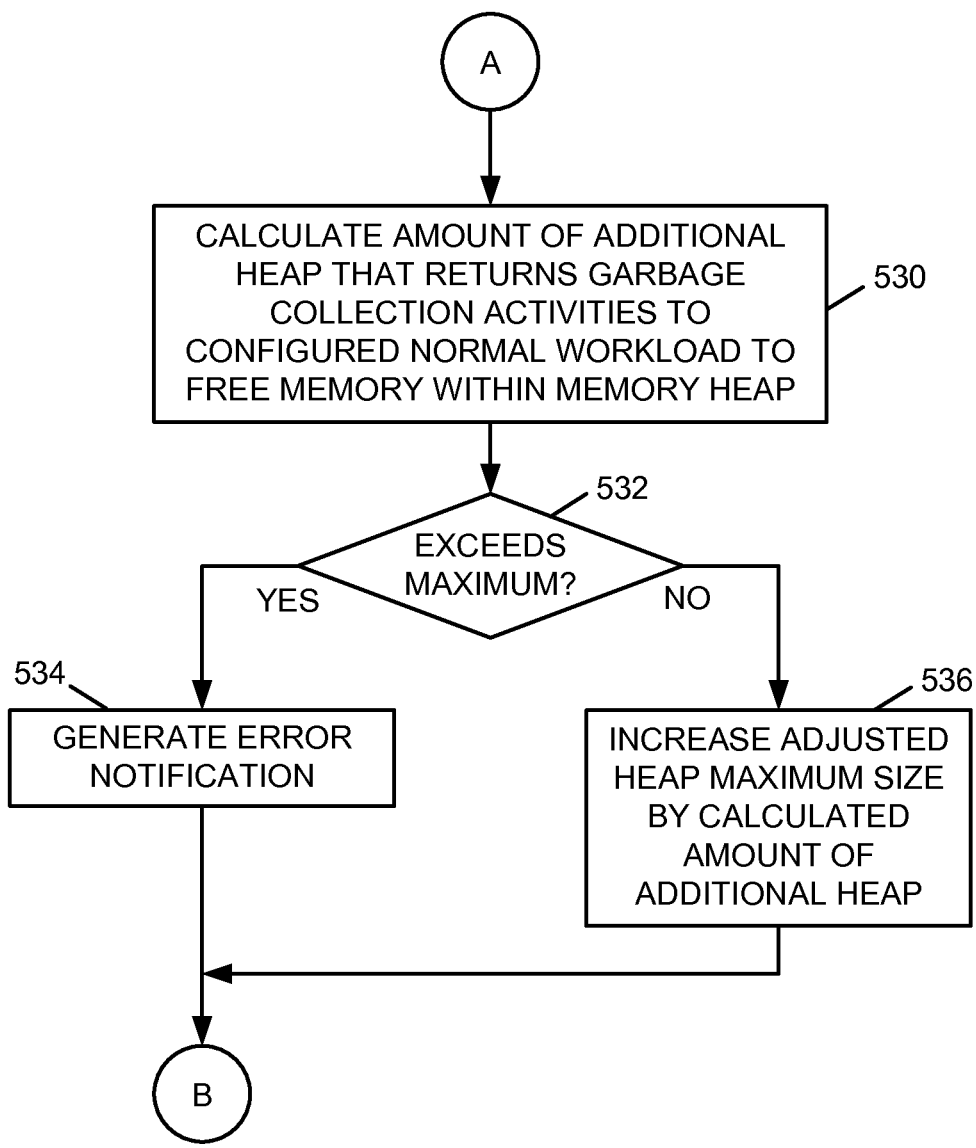
FIG. 5B is a flow chart of an example of an implementation of additional processing within a process for out-of-memory avoidance in dynamic virtual machine memory adjustment according to an embodiment of the present subject matter.

FIG. 4 through FIG. 5B described below represent example processes that may be executed by devices, such as the core processing module 200, to perform the out-of-memory avoidance in dynamic virtual machine memory adjustment associated with the present subject matter. Many other variations on the example processes are possible and all are considered within the scope of the present subject matter. The example processes may be performed by modules, such as the out-of-memory avoidance module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for out-of-memory avoidance in dynamic virtual machine memory adjustment. At block 402, the process 400 detects, via a processor, an unused free memory shortage relative to an adjusted heap maximum size associated with a memory heap of application memory allocations, where the adjusted heap maximum size is set to a heap size smaller than a maximum heap allocation size. At block 404, the process 400 calculates an increase to the adjusted heap maximum size that resolves the unused free memory shortage. At block 406, the process 400 increases the adjusted heap maximum size by the calculated increase to the adjusted heap maximum size.

FIGS. 5A-5B illustrate a flow chart of an example of an implementation of process 500 for out-of-memory avoidance in dynamic virtual machine memory adjustment. FIG. 5A illustrates initial processing within the process 500. At decision point 502, the process 500 makes a determination as to whether a memory allocation request associated with a virtual machine has been detected. For example, the process 500 may receive a memory allocation request from an application at a virtual machine. Alternatively, the process 500 may be triggered as an out-of-memory handler associated with a garbage collector to process a detected unused free memory shortage associated with a memory heap of application memory allocations relative to an adjusted heap maximum.

In response to determining that a memory allocation request associated with a virtual machine has not been detected at decision point 502, the process 500 makes a determination at decision point 504 as to whether garbage collection processing associated with a garbage collector involves an increased difficulty in garbage collection activities to create unused free memory space relative to a configured normal workload to free memory within the memory heap. In response to determining at decision point 504 that garbage collection processing associated with a garbage collector does not involve an increased difficulty in garbage collection activities, the process 500 returns to decision point 502 and iterates as described above and in more detail below. Processing in response to an affirmative determination at decision point 504 will be deferred and described in more detail below.

Returning to the description of decision point 502, in response to determining that a memory allocation request associated with a virtual machine has been detected, the process 500 determines an amount of memory requested by the application at block 506. It should be noted that, as appropriate for a given implementation, memory allocations may be coordinated with application memory allocation requests such that each memory request that exceeds the adjusted heap maximum equates to an increase in the adjusted heap maximum that would satisfy the application memory allocation request. Alternatively, the application memory allocation request may be partially satisfied by available memory allocation space within memory heap and an unused free memory shortage may be satisfied by an increase in the adjusted heap maximum smaller than the application memory allocation request. As another alternative, the adjusted heap maximum may be increased by a larger amount than the application memory allocation request to allow additional allocations in response to the adjustment and to reduce a number of adjustments to the adjusted heap maximum. Additionally, the process 500 may calculate the increase to the adjusted heap maximum to resolve the unused free memory shortage via the out-of-memory handler, as appropriate for a given implementation.

At decision point 508, the process 500 makes a determination as to whether the amount of memory requested by the application would cause the memory heap of application memory allocations to exceed the adjusted heap maximum size. The determination of whether the amount of memory requested by the application would cause the memory heap of application memory allocations to exceed the adjusted heap maximum size may include calculating an increase to the adjusted heap maximum size that resolves an unused free memory shortage associated with the memory allocation request.

In response to determining that the amount of memory requested by the application would not cause the memory heap of application memory allocations to exceed the adjusted heap maximum size, the process 500 allocates the requested memory at block 510. At block 512, the process 500 returns an acknowledgement for the memory allocation to the application, and returns to decision point 502 and iterates as described above.

Returning to the description of decision point 508, in response to determining that the amount of memory requested by the application would cause the memory heap of application memory allocations to exceed the adjusted heap maximum size, the process 500 blocks the application (e.g., a temporary execution block) at block 514. The process 500 may, for example, block the requested application memory allocation. At block 516, the process 500 assigns the determined amount of memory requested by the application as the calculated increase to the adjusted heap maximum size. The process 500 may alternatively assign a calculated increase to the adjusted heap maximum size that resolves the unused free memory shortage, as appropriate for a given implementation, where an adjusted heap maximum increase of less than the requested memory allocation would satisfy the allocation request.

At decision point 518, the process 500 makes a determination as to whether the assigned/calculated increase to the adjusted heap maximum size that resolves the unused free memory shortage exceeds the maximum heap size for the entire heap allocated to the virtual machine. In response to determining that the assigned/calculated increase to the adjusted heap maximum size that resolves the unused free memory shortage exceeds the maximum heap size for the entire heap allocated to the virtual machine, the process 500 generates an error at block 520, and returns to decision point 502 to iterate as described above.

It should be noted that the process 500 may implement a memory allocation policy and may know the total memory and allocations to all of the instantiated virtual machines. As such, the process 500 may additionally/alternatively adjust heap maximum size allocations across a set of virtual machines to reclaim unused heap space from other virtual machines using the memory allocation policy. The process 500 may allocate that reclaimed available heap space to increase the allocated maximum heap size for the virtual machine with the free memory shortage, as appropriate for a given implementation. As such, in response to determining at decision point 518 that the assigned/calculated increase to the adjusted heap maximum size that resolves the unused free memory shortage does not exceed the maximum heap size for the entire heap (or in response to reclaiming unused heap space from other virtual machines and allocating that available heap space to increase the allocated maximum heap size for the virtual machine with the free memory shortage), the process 500 increases the adjusted heap maximum size by the amount of memory requested by the application (or that calculated amount less than the requested amount of memory as appropriate for a given implementation) at block 522. The process 500 may increase the adjusted heap maximum size by changing an adjusted heap maximum size value or by deflating a heap consumption balloon, as appropriate for a given implementation.

At block 524, the process 500 retries the memory allocation. For example, the process 500 may request a garbage collector to retry the requested application memory allocation in response to increasing the adjusted heap maximum size by the calculated increase to the adjusted heap maximum size. At decision point 526, the process 500 makes a determination as to whether the memory allocation is completed. In response to determining that the memory allocation is completed, the process 500 unblocks the application at block 528. As such, the process 500 may unblock the requested application memory allocation in response to increasing the adjusted heap maximum size by the calculated increase to the adjusted heap maximum size. The process 500 returns to decision point 502 and iterates as described above.

Returning to the description of decision point 504, in response to determining that garbage collection processing associated with a garbage collector involves an increased difficulty in garbage collection activities to create unused free memory space relative to a configured normal workload to free memory within the memory heap, the process 500 transitions to the processing shown and described in association with FIG. 5B.

FIG. 5B illustrates additional processing associated with the process 500 for out-of-memory avoidance in dynamic virtual machine memory adjustment. At block 530, the process 500 calculates an amount of additional heap memory that returns the garbage collection activities to the configured normal workload to free memory within the memory heap. At decision point 532, the process 500 makes a determination as to whether the calculated amount of additional heap memory that returns the garbage collection activities to the configured normal workload to free memory within the memory heap exceeds the maximum heap size for the entire heap allocated to the virtual machine.

In response to determining that the calculated amount of additional heap memory that returns the garbage collection activities to the configured normal workload to free memory within the memory heap exceeds the maximum heap size for the entire heap allocated to the virtual machine, the process 500 generates an error at block 534. It should be noted, as described above, that the process 500 may implement a memory allocation policy and may know the total memory and allocations to all of the instantiated virtual machines. As such, the process 500 may additionally/alternatively adjust heap maximum size allocations across a set of virtual machines to reclaim unused heap space from other virtual machines using the memory allocation policy. The process 500 may allocate that reclaimed available heap space to increase the allocated maximum heap size for the virtual machine with the free memory shortage, as appropriate for a given implementation.

As such, in response to determining at decision point 532 that the calculated amount of additional heap memory that returns the garbage collection activities to the configured normal workload to free memory within the memory heap does not exceed the maximum heap size for the entire heap allocated to the virtual machine (or in response to reclaiming unused heap space from other virtual machines and allocating that available heap space to increase the allocated maximum heap size for the virtual machine for which the garbage collection processing is experiencing memory pressure), the process 500 increases the adjusted heap maximum size by the calculated amount sufficient to relieve the memory pressure at block 536. The process 500 may increase the adjusted heap maximum size by changing an adjusted heap maximum size value or by deflating a heap consumption balloon, as appropriate for a given implementation. In response to either generating the error notification at block 534, or in response to increasing the adjusted heap maximum size by the calculated amount sufficient to relieve the memory pressure at block 536, the process 500 returns to the processing described in association with FIG. 5A at block 502 and iterates as described above.

As such, the process 500 detects memory allocation requests and processes those requests to determine if the memory allocation requests would exceed a current configured adjusted heap maximum size. The process 500 calculates an amount of additional heap space to satisfy memory allocation requests that would exceed the current configured adjusted heap maximum size, and increases the adjusted size of the memory heap for the respective virtual machine(s). The process 500 may also adjust allocated heap sizes across multiple virtual machines, reclaim unused heap space, and redistribute the reclaimed memory space to other virtual machines that are experiencing unused free memory shortages. The process 500 may also operate to detect that a garbage collector is experiencing memory pressure while trying to collect unused memory, and may increase an adjusted heap maximum size to alleviate the memory pressure.

As described above in association with FIG. 1 through FIG. 5B, the example systems and processes provide out-of-memory avoidance in dynamic virtual machine memory adjustment. Many other variations and additional activities associated with out-of-memory avoidance in dynamic virtual machine memory adjustment are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    detecting, via a processor, an unused free memory shortage relative to an adjusted heap maximum size associated with a memory heap of application memory allocations, where the adjusted heap maximum size is set to a heap size smaller than a maximum heap allocation size;
    calculating an increase to the adjusted heap maximum size that resolves the unused free memory shortage; and
    increasing the adjusted heap maximum size by the calculated increase to the adjusted heap maximum size.

2. The method of claim 1, where detecting, via the processor, the unused free memory shortage relative to the adjusted heap maximum size associated with the memory heap of application memory allocations comprises:
    receiving a memory allocation request from an application;
    determining an amount of memory requested by the application; and
    determining that the amount of memory requested by the application would cause the memory heap of application memory allocations to exceed the adjusted heap maximum size.

3. The method of claim 2, where:
    calculating the increase to the adjusted heap maximum size that resolves the unused free memory shortage comprises:
        assigning the determined amount of memory requested by the application as the calculated increase to the adjusted heap maximum size; and
    increasing the adjusted heap maximum size by the calculated increase to the adjusted heap maximum size comprises:
        increasing the adjusted heap maximum size by the determined amount of memory requested by the application.

4. The method of claim 1, where:
    detecting, via the processor, the unused free memory shortage relative to the adjusted heap maximum size associated with the memory heap of application memory allocations comprises determining that garbage collection processing involves an increased difficulty in garbage collection activities to create unused free memory space relative to a configured normal workload to free memory within the memory heap; and
    calculating the increase to the adjusted heap maximum size that resolves the unused free memory shortage comprises calculating an amount of additional heap memory that returns the garbage collection activities to the configured normal workload to free memory within the memory heap.

5. The method of claim 1, where increasing the adjusted heap maximum size by the calculated increase to the adjusted heap maximum size comprises one of changing an adjusted heap maximum size value and deflating a heap consumption balloon.

6. The method of claim 1, further comprising:
    blocking, in response to detecting the unused free memory shortage, a requested application memory allocation; and
    unblocking the requested application memory allocation in response to increasing the adjusted heap maximum size by the calculated increase to the adjusted heap maximum size.

7. The method of claim 1, where detecting, via the processor, the unused free memory shortage relative to the adjusted heap maximum size associated with the memory heap of application memory allocations comprises detecting the unused free memory shortage via a garbage collector executed by the processor, and further comprising:
    triggering, via the garbage collector in response to detecting the unused free memory shortage, an out-of-memory handler to process the detected unused free memory shortage;
    where calculating the increase to the adjusted heap maximum size that resolves the unused free memory shortage comprises calculating, via the out-of-memory handler, the increase to the adjusted heap maximum size to resolve the unused free memory shortage; and
    further comprising requesting, via the out-of-memory handler, the garbage collector to retry a requested application memory allocation in response to increasing the adjusted heap maximum size by the calculated increase to the adjusted heap maximum size.

8. The method of claim 1, further comprising:
    utilizing a memory allocation policy to identify total memory and allocations associated with a plurality of instantiated virtual machines;
    reclaiming unused heap space from at least one of the plurality of instantiated virtual machines based upon the memory allocation policy; and
    where increasing the adjusted heap maximum size by the calculated increase to the adjusted heap maximum size comprises increasing the adjusted heap maximum size by the calculated increase to the adjusted heap maximum size using the reclaimed unused heap space.

* * * * *